Dec. 25, 1951     R. D. WILEY     2,580,209
FILTER FOR FLUIDS
Filed Jan. 12, 1949     2 SHEETS—SHEET 1
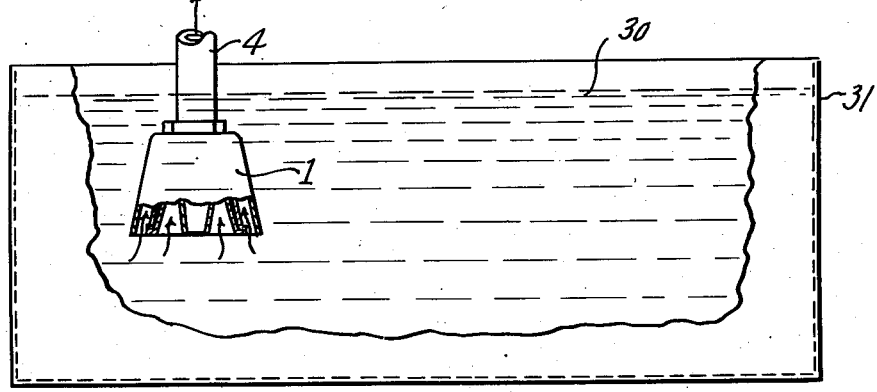
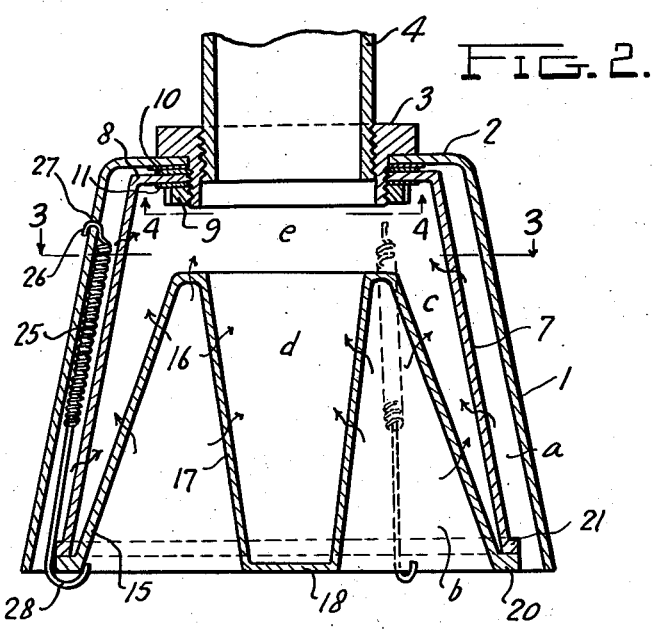
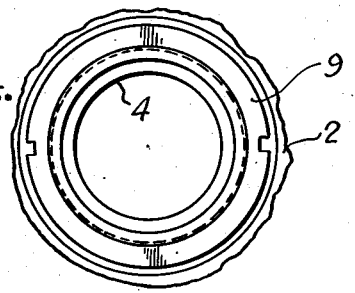
INVENTOR.
Robert D. Wiley
BY
Barnes, Kisselle, Laughlin & Raisch
ATTORNEYS Dec. 25, 1951 R. D. WILEY 2,580,209
FILTER FOR FLUIDS
Filed Jan. 12, 1949 2 SHEETS—SHEET 2
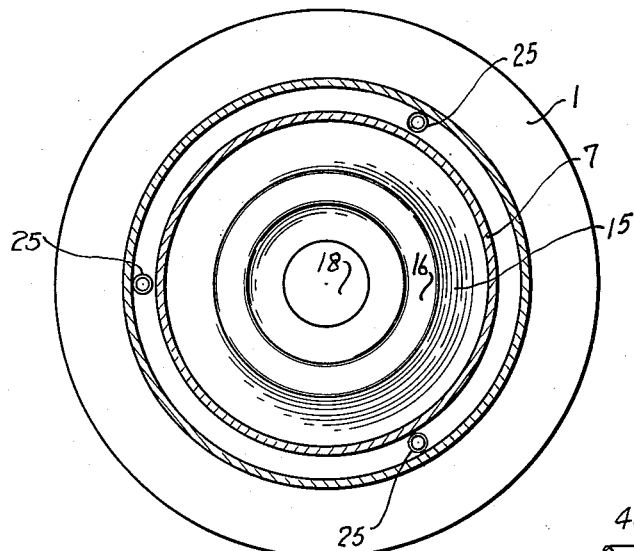
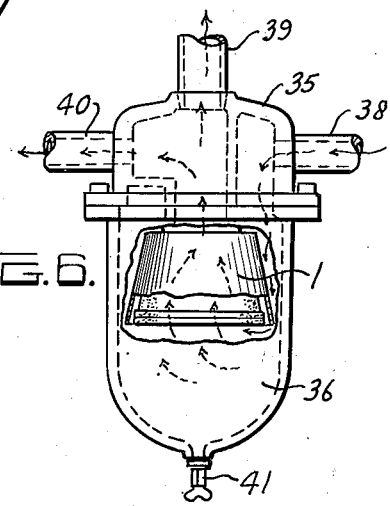
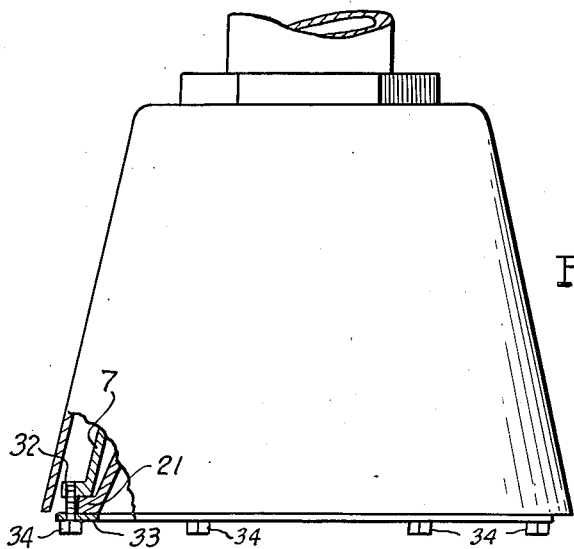
INVENTOR.
Robert D. Wiley
BY
ATTORNEYS Patented Dec. 25, 1951

2,580,209

UNITED STATES PATENT OFFICE 2,580,209

FILTER FOR FLUIDS

Robert D. Wiley, Birmingham, Mich.

Application January 12, 1949, Serial No. 70,538

5 Claims. (Cl. 210—94)

This invention relates to filters for fluids and it has to do particularly with a filter construction which embodies a filtering body of solid porous nature.

The general objects of the invention are to provide a filter of non-complicated construction so that the same may be manufactured economically and assembled and disassembled with ease and to provide a filtering medium so constructed and arranged as to afford a large area through which the fluids may flow. By providing a large area or surface, the fluid may be caused to flow therethrough with a minimum of back pressure and yet an efficient filtering action attained. A filter structure made in accordance with the invention is shown in the accompanying drawings:

Fig. 1 is a general view illustrating one manner of use of the filter.

Fig. 2 is an enlarged cross sectional view taken through the filter showing the external shell and the filtering elements.

Fig. 3 is a cross sectional view taken on line 3—3 of Fig. 2 showing structural features.

Fig. 4 is a view looking on line 4—4 of Fig. 2 showing a mounting.

Fig. 5 is a view with parts broken away and parts in section showing a modified form.

Fig. 6 is a view with parts broken away illustrating the filter and a housing therefor as used in a pressure system.

The filter shown as one embodiment of the invention has an interior shell, preferably of metal. This shell, as shown in Fig. 2, is of frusto-conical form, and somewhat of cup shape, having a side wall 1 and a bottom 2 which is provided with an aperture for receiving a fitting 3 which may, in turn, receive a pipe or conduit 4. Although the shell is shown used in inverted manner it may be used, if desired, with the large end opening upwardly, and the end wall 2 will therefore be referred to as the bottom or base of the shell.

The filtering medium is disposed within the shell and it comprises two elements somewhat of cup shape which are preferably separately formed. These elements are disposed one within another, and the outer one is of frusto-conical shape having a wall 7 with a bottom wall 8, apertured to receive the fitting 3. The fitting 3 has a head which lies outside of the bottom 2 of the outer shell and its extension is screw threaded for receiving a nut 9. Suitable washers, as shown, at 10 and 11, may be used on opposite sides of the bottom 8 of the outer element, and thus the outer element is fixedly mounted within the shell 1.

The filtering element is a porous solid material such as sintered bronze or other porous or sintered metals or other materials. This material forms a strong body capable of maintaining its geometrical shape and offers extremely low resistance to the passage of filtrate. The material has the appearance and feel of solid metal and will not disintegrate or flake away. Tortuous or twisting invisible passages are disposed in the walls of the filtering element between the sintered particles. While the filtering action occurs throughout the depth of the material through which the filtrate flows, most filtered out particles will be stopped on the surface of the filtering element, thus making the cleaning of the filter a simple matter.

The inner filtering element, preferably of the same material, is formed with an outer wall 15 and extending from its bottom wall portion 16 is a central wall portion 17 with a closed end part 18. As shown in Fig. 2, the wall 7 is spaced from the outer shell 1 thus providing a flow passage $a$ for the entrance of fluid to be filtered and the wall 17 is spaced from the wall 15 thus providing a flow passage $b$ for the entrance of filtrate. Between the walls 7 and 15 is an outgoing passage $c$ while within the central member is an area or flow passage $d$ and passages $c$ and $d$ communicate with a chamber $e$ which in turn is in communication with the conduit 4.

The wall 15 of the inner member has a flange 20 which seats upon the peripheral edge of the wall 7 which may be flanged at 21 for the purpose. A convenient manner of holding the inner element in assembly is by the use of coil spring holding elements, one of which is shown at 25, with one end 26 hooked into an aperture 27 in the outer shell and having at its other end, a hook 28 arranged to engage over the flange 20. As shown in Fig. 3, three of such springs are used. To disassemble the parts the springs may be stretched and twisted so that the hooks 28 engage over the free edge of the outer shell. The inner element may then be lifted out of place, and the outer element may be removed by first removing the nut 9. Thus the parts may be thus easily disassembled for cleaning and the assembly is made in the reverse manner.

One manner of use, of this construction, is shown in Fig. 1, where the filter is submerged in a body of liquid 30 in a sump or tank 31. An arrangement of this kind may be used for the inlet of a pump which may be pumping hydraulic medium, such as oil, or water, or any other liquid. The liquid to be filtered passes into passage $a$ and into passage $b$. It will be noted that the liquid may flow through the entire area of the wall 7 into passage $c$ and the liquid may also pass from the passage $b$ through the walls 15 and 17 of the inner element. Also the liquid may pass through the wall 18. In this manner, an exceedingly large area of filtering material is provided, resulting in a minimum of resistance to the flow of filtrate therethrough. Moreover, note that the passage c gradually increases in cross sectional area from the bottom to the top thereof to thus accommodate the liquid passing through the walls 7 and 15. Also, the outlet passage d gradually increases in cross sectional area. As a result, the outlet passages leading to the chamber e of gradually increasing area with the result that there is no location in the passage which tends to choke or reduce flow.

Should it be desired to arrange the filter so that it may be cleaned by flowing substance through the same in the reverse direction, it is preferred to mount the inner element by means other than the springs. Such a reverse flow for cleaning purposes is made at relatively high velocity and under some pressure, and it would accordingly be possible to blow the inner element off its seat. In Fig. 5, an arrangement is shown where the wall 7 of the outer element is provided with several spaced lugs 32 and a washer 33 may be placed over the flange 21 of the inner element and cap screws 34 may be passed through the washer and into the lugs 32. The wall 7 may be provided with any suitable number of these lugs depending on requirements and about six lugs equally circumferentially placed is believed to be an advisable structure.

Where the filter is used in a pressure system, that is, where the medium is under pressure, an arrangement such as is shown in Fig. 6, may be employed. In this case, there is provided a housing having a dome or top element 35 with a removable lower portion 36. The filtering element, as shown, is mounted therein and the housing has an inlet 38 and one or more outlets 39 and 40, depending upon the desires. The medium under pressure enters the housing through the conduit 38, passes downwardly into the lower portion 36, around the outside of the outer shell 1 and then upwardly through the filtering material and out the passage 39 or 40 or both. The lower portion 36 constitutes a sediment sump or trap which may be cleaned by removing the same. Also, the lower portion is preferably provided with a drain valve 41 which may be opened to drain the sump and particularly to drain water, which may condensate and collect in a pressure system.

The filter of this invention may be used for filtering gaseous filtrate as well as liquid filtrate. In fact, the arrangement shown in Fig. 6 may be employed in an air pressure system with the air flowing through the filter, as above described, and in such a situation water may collect in the bottom of the housing. In addition to air pressure lines the filter may be used in lines for other gas, such as oxygen and the liquids with which the filter may be used are such as oil, water, fuel oil, gasoline, and the like. As an example of the area of filtering material, which can be obtained, it may be pointed out that a filtering medium having a diameter of about six inches across the large end of the outer element, and a height of about five inches measured along the wall 7, presents about 160 square inches of filtering medium.

I claim:

1. A filter comprising, an outer filtering member of cup form having a bottom portion and a circumferential wall portion with a rim, an inner filtering member of cup like form having a bottom portion and a circumferential wall with a rim, said inner filtering member being disposed within the outer filtering member with the rims of the walls thereof in assembled relationship, the bottom portion of the inner filtering member having an inner tubular like extension which projects into the cup formation of the inner filtering member, the circumferential wall of the inner filtering member lying between the circumferential wall of the outer filtering member and the wall defining the tubular extension and being spaced from both, the bottom portion of said outer filtering member being spaced from the bottom portion of the inner filtering member and being apertured for connection with a conduit.

2. A filter comprising, an outer cup shaped member of filtering material having a bottom portion and a wall portion with a rim, said member being substantially of frusto-conical shape whereby the circumferential wall portion is inclined relative to the axis of the member, an inner cup shaped member of filtering material having a bottom portion and a circumferential wall portion with a rim, and being substantially of frusto-conical form, the inner filtering member being disposed within the outer filtering member with the rims of the two circumferential walls in interfitting relationship, means for holding the members in this assembled position, the circumferential wall of the inner member being on an angle greater than that of the circumferential wall of the outer member to provide a tapering circumferential space therebetween, the bottom portion of the inner filtering member having a hollow projection closed at its end and extending within the inner member, the wall defining the hollow projection being tapered and spaced from the circumferential wall of the inner member, and a fitting in the bottom portion of the outer filtering member for receiving a conduit.

3. A filter comprising, a cup shaped outer filtering member having a side wall and a bottom wall, conduit means connecting into the bottom wall of and providing a support for said outer filtering member, an inner filtering member of cup shape positioned within the outer member and having its side wall spaced from the said wall of the outer member, said inner member having a closed tubular like extension projecting from its bottom wall in a direction away from the bottom wall of the outer filtering member, the wall defining the projection being spaced from the side wall of the inner filtering member, the edges of said inner and outer filtering members at the open ends thereof being connected in assembled relation to provide a chamber between said filtering members which opens into said conduit.

4. A filter comprising, a shell of frusto-conical form having a bottom portion and being open at its large end, an outer filtering member of frusto-conical form having a bottom portion and open at its large end and positioned within the shell with its circumferential wall spaced from the wall of the shell, whereby fluid may pass therebetween, a conduit passing through the bottom portion of said shell and connecting into the bottom portion of the outer filtering member, an inner filtering member of filtering material and of frusto-conical form having a bottom portion, being open at its large end and positioned within the outer member with the rims of the walls of said members in assembled relationship, the wall of the inner member being spaced from the wall of the outer member, the inner member having a hollow extension projecting from its bottom and within the inner member, the wall defining the hollow projection being spaced from the wall of the inner filtering member, and spring means attached to the outer shell and engaging the rim of the inner filtering member to hold the inner filtering member in position against the rim of the outer filtering member.

5. A filter comprising, an outer filtering member of porous sintered metal having an annular wall with a bottom wall at one end and open at the other end, a fitting in the bottom wall for receiving a conduit, an inner filtering member of porous sintered metal having an annular wall open at one end, the annular wall of the inner member being within and spaced from the annular wall of the outer member and the edges of the annular walls at their open ends being engaged in closed relationship, the inner filtering member having a bottom portion spaced from the bottom wall of the outer filtering member, a hollow extension projecting from the bottom portion of the inner filtering member in a direction toward the open of the inner filtering member, the hollow extension being spaced inwardly from the annular wall of the inner filtering member, the hollow extension opening through the bottom portion of the inner filtering member and being closed at its end which is remote from the bottom portion of the inner filtering member, and means for holding the filtering members in assembled relationship with the edges at the open ends of the annular walls thereof in closed relationship.

ROBERT D. WILEY.

REFERENCES CITED

The following references are of record in the file of this patent:

UNITED STATES PATENTS

| Number | Name | Date |
|---|---|---|
| 1,767,221 | Meyer | June 24, 1930 |
| 2,427,320 | Zech | Sept. 9, 1947 |

FOREIGN PATENTS

| Number | Country | Date |
|---|---|---|
| 507,762 | Great Britain | June 19, 1939 |